United States Patent
Shibata et al.

(10) Patent No.: US 10,520,126 B2
(45) Date of Patent: Dec. 31, 2019

(54) HEAT INSULATING STRUCTURE USING AEROGEL

(71) Applicant: PANASONIC INTELLECTUAL PROPERTY MANAGEMENT CO., LTD., Osaka (JP)

(72) Inventors: Tetsuji Shibata, Osaka (JP); Kenta Hosoi, Kyoto (JP); Yasuhiro Hidaka, Osaka (JP); Hideyuki Ando, Osaka (JP); Kazuma Kugimiya, Osaka (JP); Yoshimitsu Ikoma, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 511 days.

(21) Appl. No.: 14/770,179

(22) PCT Filed: Feb. 27, 2014

(86) PCT No.: PCT/JP2014/001066
§ 371 (c)(1),
(2) Date: Aug. 25, 2015

(87) PCT Pub. No.: WO2014/132652
PCT Pub. Date: Sep. 4, 2014

(65) Prior Publication Data
US 2016/0003404 A1 Jan. 7, 2016

(30) Foreign Application Priority Data

Feb. 28, 2013 (JP) .................................. 2013-040053

(51) Int. Cl.
*F16L 59/02* (2006.01)
*B32B 7/12* (2006.01)
(Continued)

(52) U.S. Cl.
CPC .............. *F16L 59/029* (2013.01); *B32B 5/18* (2013.01); *B32B 5/245* (2013.01); *B32B 7/12* (2013.01);
(Continued)

(58) Field of Classification Search
CPC ......................... B32B 2307/304; F15L 59/029
See application file for complete search history.

(56) References Cited

U.S. PATENT DOCUMENTS 2,692,219 A * 10/1954 Slayter .................... C04B 28/30
106/286.4
4,118,814 A * 10/1978 Holtom ................ B29C 66/124
114/357

(Continued)

FOREIGN PATENT DOCUMENTS

| JP | S57-209817 A | 12/1982 |
| JP | 59-124145 | 3/1986 |

(Continued)

OTHER PUBLICATIONS

International Search Report issued with respect to application No. PCT/JP2014/001066, dated Jun. 3, 2014.

(Continued)

*Primary Examiner* — Mark Ruthkosky
*Assistant Examiner* — Julia L Rummel
(74) *Attorney, Agent, or Firm* — Greenblum & Bernstein, P.L.C.

(57) ABSTRACT

An object of the present invention is to propose heat insulating structure which is excellent in thermal insulating properties and higher in strength. The heat insulating structure includes: an aerogel layer including aerogel particles, adhesive, and fibers; and a retainer which is provided to at least one face of the aerogel layer and includes fiber mate- (Continued)

rials and binder resin. Each of the fibers is part of one of the fiber materials included in the retainer.

7 Claims, 4 Drawing Sheets

(51) Int. Cl.
  *B32B 5/18* (2006.01)
  *B32B 5/24* (2006.01)
  *B32B 27/06* (2006.01)

(52) U.S. Cl.
  CPC ...... *B32B 27/065* (2013.01); *B32B 2262/106* (2013.01); *B32B 2307/304* (2013.01); *B32B 2605/00* (2013.01); *B32B 2605/18* (2013.01)

(56) References Cited

U.S. PATENT DOCUMENTS

| | | | |
|---|---|---|---|
| 4,402,927 A | 9/1983 | Dardel et al. | |
| 4,432,956 A | 2/1984 | Zarzycki et al. | |
| 4,610,863 A | 9/1986 | Tewari et al. | |
| 5,834,082 A * | 11/1998 | Day | B29C 44/06 428/56 |
| 2002/0025427 A1 * | 2/2002 | Schwertfeger | B32B 27/18 428/331 |
| 2003/0003284 A1 | 1/2003 | Schwertfeger et al. | |
| 2003/0215640 A1 | 11/2003 | Ackerman et al. | |
| 2006/0263587 A1 | 11/2006 | Ou et al. | |
| 2006/0276093 A1 * | 12/2006 | Agrawal | B32B 5/18 442/374 |
| 2007/0289974 A1 * | 12/2007 | Blair | F17C 13/001 220/560.15 |
| 2010/0038487 A1 | 2/2010 | Kolax et al. | |
| 2011/0206471 A1 * | 8/2011 | Doshi | C04B 14/064 408/1 R |
| 2013/0160945 A1 * | 6/2013 | Huang | C08L 3/02 156/328 |

FOREIGN PATENT DOCUMENTS

| | | |
|---|---|---|
| JP | S61-40229 U | 3/1986 |
| JP | H10-147664 A | 6/1998 |
| JP | 2003-074786 A | 3/2003 |
| JP | 2007-230858 A | 9/2007 |
| JP | 2009-299893 A | 12/2009 |
| JP | 2010-516537 A | 5/2010 |
| JP | 2014-035041 A | 2/2014 |
| JP | 2014-035042 A | 2/2014 |
| JP | 2014-035043 A | 2/2014 |
| JP | 2014-035044 A | 2/2014 |
| WO | 2008/090097 A1 | 7/2008 |
| WO | WO-2012033998 A2 * | 3/2012 ............ C09J 103/02 |

OTHER PUBLICATIONS

International Preliminary Report on Patentability issued with respect to application No. PCT/JP2014/001066, dated Sep. 1, 2015.
European Search Report issued with respect to application No. 14756493.4, dated Jan. 29, 2016.

* cited by examiner

HEAT INSULATING STRUCTURE USING AEROGEL

TECHNICAL FIELD

The present invention relates to heat insulating structure using aerogel available for aircrafts, vehicles and the like.

BACKGROUND ART

As thermal insulators, there have been known foam materials such as urethane foam and phenolic foam (foam-based thermal insulator). The foam materials exert the thermal insulating properties derived from their air bubbles generated by foaming. However, such urethane foam and phenolic foam typically have thermal conductivities higher than the thermal conductivity of the air. It is therefore of advantage to make the thermal conductivity of the thermal insulator be less than that of the air, for further improving the thermal insulating properties. As methods for achieving such thermal conductivities that are less than that of the air, there has been known a method of filling air-gaps of the foamed material (such as urethane foam and phenolic foam) with a gas having low thermal conductivities (e.g., chlorofluorocarbon), or the like. However, the method of filling air-gaps with the gas has a concern that the filled gas possibly leaks from the air-gaps over time, and which possibly causes increase in the thermal conductivities.

In recent years, there have been proposed vacuum-based methods for improving the thermal insulating properties. In the methods, for example, porous materials of calcium silicate and/or glass fibers are used and they are put in an airtight bag and maintained at vacuum state of about 10 Pa. However, the vacuum-based thermal insulating methods require the maintenance of the vacuum state, and thus have problems in temporal deterioration and production cost. Moreover, in the thermal insulator based on the vacuum, the shape of the thermal insulator would be restricted because it needs to maintain the vacuum state, and its application field is thus severely limited. Accordingly, the thermal insulator based on the vacuum has been limited in practical use.

In this regard, Patent Literature 1 discloses, as heat insulating structure having high intensity used for a vehicle body of aircraft or the like, body structure of aircraft having a foam layer serving as thermal insulator. However, in the structure disclosed in the patent literature, a heat insulating layer is made of resin foam material and has poor thermal insulating properties, and therefore increase in thickness of the heat insulating layer is required to achieve a heat insulating effect. Further, the heat insulating layer is formed on a framework by spraying, and therefore it is difficult to replace the heat insulating layer when its thermal insulating properties are decreased.

CITATION LIST

Patent Literature

Patent Literature 1: JP 2010-516537 A
Patent Literature 2: U.S. Pat. No. 4,402,927
Patent Literature 3: U.S. Pat. No. 4,432,956
Patent Literature 4: U.S. Pat. No. 4,610,863

SUMMARY OF INVENTION

Technical Problem

Incidentally there has been known an aggregate of fine porous silica (so-called aerogel) as a material for a thermal insulator that exerts the thermal conductivity lower than that of the air under ordinary pressure. This material can be obtained by methods disclosed in U.S. Pat. Nos. 4,402,927, 4,432,956, and 4,610,863, for example. According to these methods, silica aerogel can be produced by using alkoxysilane (which is also called "silicon alkoxide" and "alkyl silicate") as raw material. Specifically, the silica aerogel can be obtained by: hydrolyzing the alkoxysilane under presence of solvent to produce wet gelled compound having silica skeleton as a result of condensation polymerization; and drying the wet gelled compound under supercritical condition, which is no less than a critical point, of the solvent. As the solvent, alcohol, liquefied carbon dioxide, and the like may be used, for example.

Aerogel particles, which are particulate materials of the aerogel, have the thermal conductivity lower than that of the air, are formable into various shapes and easy to handle, and thus are useful as raw materials for a thermal insulator. Thus, it may be possible to use the aerogel particles as material of a thermal insulator by bonding the aerogel particles with adhesive.

However, the aerogel particles are very lightweight, poor in strength and brittle. Since the aerogel particles themselves are brittle, a body of a thermal insulator formed by molding the aerogel particles has a poor strength and is liable to crack, be chipped off or be broken. Particularly, when the aerogel particles are used as material of a vehicle body of an aircraft, a vehicle, a ship, a spacecraft, or the like, an aerogel compact is liable to be damaged, and therefore a defect or decrease in thermal insulating properties may cause. To increase the strength, it may be possible to add reinforcing material to the aerogel or the like or to increase the amount of adhesive to be used. However, in this case, the added reinforcing material or the increased amount of adhesive may cause decrease in the thermal insulating properties. In view of the above circumstances, it is required to increase strength of the thermal insulator while preventing deterioration in thermal insulating properties thereof so as to achieve both requirements of sufficient strength and thermal insulating properties.

The present invention has been made in view of the above circumstances, and an object thereof is to propose heat insulating structure which is higher in strength and is excellent in thermal insulating properties

Solution to Problem

Heat insulating structure in accordance with the present invention includes: an aerogel layer including aerogel particles, adhesive, and fibers; and a retainer which is provided to at least one face of the aerogel layer and includes fiber materials and binder resin. Each of the fibers is part of one of the fiber materials included in the retainer.

It is preferable that the adhesive included in the aerogel layer and the binder resin included in the retainer be mixed with each other at an interface between the aerogel layer and the retainer.

It is preferable that the fiber material be a carbon fiber.

It is preferable that the aerogel layer be provided on one face of the aerogel layer with the retainer, and the aerogel layer be provided on the other face of the aerogel layer with a fiber sheet.

It is preferable that a heat barrier layer be formed so as to extend along the aerogel layer.

It is preferable that the retainer be provided with an attachment structure for attachment to a structure.

It is preferable that a fillet part be situated at a boundary between the aerogel layer and the retainer.

It is preferable that the fillet part have porous structure.

Advantageous Effects of Invention

According to the present invention, an aerogel layer is reinforced by a retainer including fiber materials, and therefore it is possible to obtain a heat insulating structure which is higher in strength and is excellent in thermal insulating properties.

DESCRIPTION OF EMBODIMENTS

Aerogel is a porous material (porous body) and is obtained by drying a gel so as to substitute the solvent included in the gel for a gas. Particulate material of the aerogel is called aerogel particle. Known examples of the aerogel include silica aerogel, carbon aerogel, and alumina aerogel, and the silica aerogel is preferably used among them. The silica aerogel is excellent in thermal insulating properties, is easy to produce, and is low in producing cost, and thus is easy to obtain compared to other kind of aerogels. Note that, materials which are produced as a result of full evaporation of solvent in gel and have mesh structures with air gaps may be called "xerogel", but the aerogel of the present specification may include the xerogel.

Figure 6A:
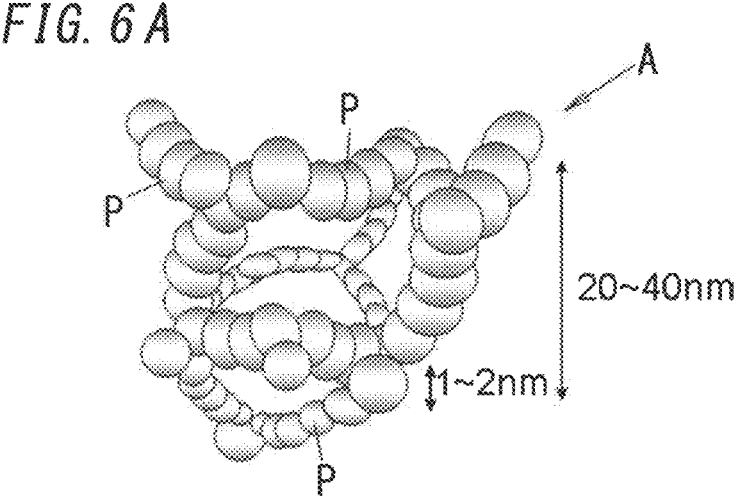
FIG. 6A is a schematic diagram illustrating an example of an aerogel particle.
Figure 6B:
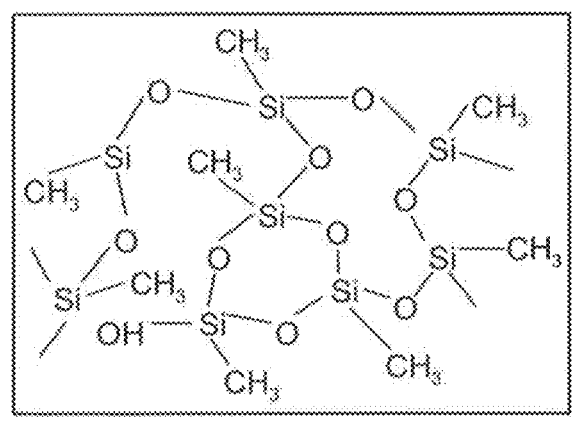
FIG. 6B is a schematic diagram illustrating the example of the aerogel particle.
Figure 6C:
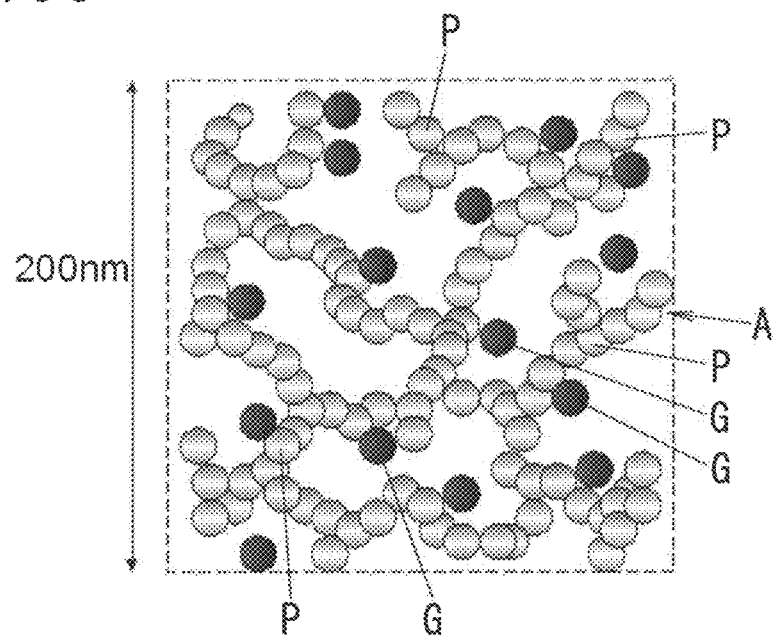
FIG. 6C is a schematic diagram illustrating the example of the aerogel particle.

FIGS. 6A to 6C show schematic diagrams of an example of the aerogel particle. As shown in FIGS. 6A and 6B, the aerogel particle A is a silica aerogel particle, and is a silica ($SiO_2$) structure having pores of which size being about several tens of nanometers (in a range of 20 to 40 nm, for example). Such aerogel particle A can be obtained by a supercritical drying or the like. The aerogel particle A is constituted by fine microparticles P (silica microparticles) that are bound to each other so as to form a three dimensional mesh shape. Size of one silica microparticle is, for example, about 1 to 2 nm. As shown in FIG. 6C, gases G are allowed to enter the pores, sizes of which are about several tens of nanometers, of the aerogel particle A. These pores block the transfer of the components of the air such as nitrogen and oxygen, and accordingly it is possible to reduce the thermal conductivities to the extent less than that of the air. For example, a conventional thermal insulator provided with the air has a thermal conductivity (WLF) λ of 35 to 45 mW/m·K, but a thermal conductivity (WLF) λ of a thermal insulator can be reduced to about 9 to 12 mW/m·K by the aerogel particles A. Typically, aerogel particles A have hydrophobic properties. For example, in the silica aerogel particle shown in FIG. 6B, most of silicon atoms (Si) are bound to alkyl group(s) (methyl group, $CH_3$), and a small number of them are bound to hydroxyl group(s) (OH). This silica aerogel particle therefore has a comparatively low surface polarity.

Figure 7:
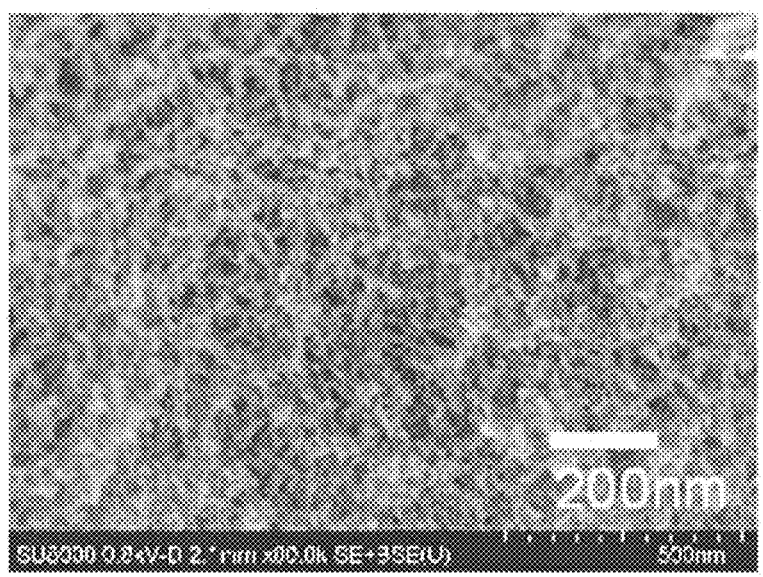
FIG. 7 is an electronic microscope photograph of the aerogel particle.

FIG. 7 is an electron micrograph of a silica aerogel particle. The silica aerogel particle was obtained by a supercritical drying method. It can also be understood from this graph that a silica aerogel particle has a three-dimensional steric mesh structure. The mesh structure of an aerogel particle A is typically formed of linearly bound silica microparticles having a size of less than 10 nm. Note that, the mesh structure may have ambiguous boundaries between microparticles, and some part of the mesh structure may be formed of linearly extended silica structures (—O—Si—O—).

The aerogel particles for the heat insulating structure are not limited particularly, and it is possible to use the aerogel particles obtained by a commonly-used producing method. Typical examples of the aerogel particles include: aerogel particles obtained by the supercritical drying method; and aerogel particles obtained by ordinary pressure drying method.

The aerogel particles obtained by the supercritical drying method can be obtained by: preparing silica particles by polymerizing raw material by the sol-gel method which is a liquid phase reaction method; and removing the solvent thereof by the supercritical drying. For example, alkoxysilane (which is also called "silicon alkoxide" or "alkyl silicate") is used as the raw material. The alkoxysilane is hydrolyzed under presence of solvent to generate a wet gelled compound having silica skeleton as a result of condensation polymerization, and thereafter the wet gelled compound is dried under supercritical condition in which a temperature and a pressure are equal to or more than those of a critical point of the solvent. The solvent may be alcohol, liquefied carbon dioxide or the like. According to the drying of the gel compound under the supercritical condition, the solvent thereof is removed while the mesh structure of the gel is maintained, and as a result the aerogel can be obtained. Aerogel particles, which are particulate materials of the aerogel, can be obtained by pulverizing the solvent-including gel into particles, and thereafter drying the particles of the solvent-including gel by the supercritical drying. Alternatively, aerogel particles can be obtained by pulverizing a bulk body of aerogel obtained as a result of the supercritical drying.

The alkoxysilane as the raw material of the aerogel particles is not limited particularly, but may be bifunctional axkoxysilane, trifunctional axkoxysilane, tetrafunctional axkoxysilane, or a combination of them. Examples of the bifunctional alkoxysilane include dimethyldimethoxysilane, dimethyldiethoxysilane, diphenyldiethoxysilane, diphenyldimethoxysilane, methylphenyldiethoxysilane, methylphenyldimethoxysilane, diethyldiethoxysilane, and diethyldimethoxysilane. Examples of the trifunctional alkoxysilane include methyltrimethoxysilane, methyltriethoxysilane, ethyltrimethoxysilane, ethyltriethoxysilane, phenyltrimethoxysilane, and phenyltriethoxysilane. Examples of the tetrafunctional alkoxysilane include tetramethoxysilane, and tetraethoxysilane. Bis(trimethylsilyl)methane, bis(trimethylsilyl)ethane, bis(trimethylsilyl)hexane, or vinyltrimethoxysilane may be used as the alkoxysilane. Partial hydrolysate of the alkoxysilane may be used as the raw material.

The hydrolysis and the condensation polymerization of the alkoxysilane are preferably performed under presence of water, and more preferably performed under presence of a mixed liquid of water and organic solvent which the alkoxysilane is soluble in and is compatible with water. Use of such a mixed liquid as the solvent makes it possible to perform the hydrolysis process and the condensation polymerization process in succession, and accordingly the gel can be obtained efficiently. In this process, the polymer generated as a gelled substance (wet gel) exists in the solvent as dispersion medium. The solvent which the alkoxysilane is soluble in and is compatible with water is not limited particularly. Examples of such a solvent include: alcohol such as methanol, ethanol, propanol, isopropanol and butanol; acetone; and N,N-dimethylformamide. These materials may be used alone or in combination.

It is also preferable that the hydrolysis and the condensation polymerization of the alkoxysilane be performed under presence of catalyst which causes to desorb the alkoxy group from the alkoxysilane to facilitate the condensation reaction. Examples of such a catalyst include acidic catalyst and basic catalyst. Specifically, examples of the acidic catalyst include hydrochloric acid, citric acid, nitric acid, sulfuric acid, and ammonium fluoride. Examples of the basic catalyst include ammonia and piperidine.

An appropriate component may be added to the reaction solution of the alkoxysilane. Examples of such a component may include a surface-activating agent and a functional group induction agent. Such an additional component can provide a favorable function on the aerogel particles.

The aerogel can be obtained by drying the obtained wet gel by the supercritical drying. It is preferable that the wet gel be firstly cut or pulverized into particles to prepare the particles of the solvent-including gel, and thereafter the particles of the gel be dried by the supercritical drying. By doing so, the aerogel can be made into particles and dried without fracturing aerogel structure, and accordingly aerogel particles can be obtained easily. In this case, it is preferable to prepare the particles of gel in uniform size, and which enables the aerogel particles to be equalized in size. Alternatively, the aerogel particles may be obtained by preparing a bulk aerogel, and thereafter pulverizing the bulk body of aerogel by a pulverizing device. The obtained aerogel particles may be sieved or classified so as to give aerogel particles with more equal sizes. When sizes of aerogel particles are equalized, handleability can be improved and it is possible to easily obtain a stable body.

The aerogel particles obtained based on the liquid glass can be produced by an ordinary pressure drying method that includes sequential processes of a preparation process of silica sol, a gelling process of the silica sol, a ripening process, a pulverizing process of the gel, a solvent substitution process, a hydrophobizing process and a drying process. The liquid glass generally may be a high concentration aqueous solution of mineral silicate such as sodium silicate, and can be obtained by dissolving the mineral silicate in the water and heating it, for example.

The raw material of the silica sol may be silicate alkoxide, silicate of alkaline metal, or the like. Examples of the silicate alkoxide include tetramethoxysilane and tetraethoxysilane. The alkoxysilane described in the explanation regarding the supercritical drying method can be used as the silicate alkoxide. The silicate of alkaline metal may be potassium silicate, sodium silicate or the like. It is preferable to use the silicate of alkaline metal because it is inexpensive, and it is more preferable to use the sodium silicate because it is easily available.

In a case of using the silicate of alkaline metal, silica sol can be prepared by a method using a deacidification with an inorganic acid such as hydrochloric acid and sulfuric acid, or a method using a cation exchange resin having counter ion of H+. Among these methods, it is preferable to use a cation exchange resin.

The silica sol can be prepared by using an acid type cation exchange resin by passing a solution of silicate of alkaline metal having a proper concentration through a packed layer filled with the cation exchange resin. Alternatively, the silica sol can be prepared by: introducing a cation exchange resin into a solution of silicate of alkaline metal; mixing them; removing the alkaline metal; and thereafter removing the cation exchange resin by, for example, filtering. The amount of the cation exchange resin is preferably no less than an amount required to exchange the alkaline metal included in the solvent. The solvent is subject to dealkalization (demetallation) by the cation exchange resin.

The acid type cation exchange resin may be styrene-based, acrylic-based, or methacryl-based one, and have a replaced sulfonic acid group or carboxyl group as the ion-exchange group, for example. Among them, it is preferable to use, so-called strong acid type cation exchange resin provided with the sulfonic acid group. The cation exchange resin used for the exchange of the alkaline metal can be reused after regeneration process by passing sulfuric acid or hydrochloric acid therethrough.

The prepared silica sol is thereafter gelled, and then which is ripened. In the gelling process and the ripening process, it is preferable to control the pH thereof. Typically, the silica sol after the ion exchange process by the cation exchange resin has a comparatively low pH of, for example, 3 or less. When such a silica sol is neutralized so that the pH thereof is in a pH range of mild acidity to neutrality, the silica sol is gelled. The silica sol can be gelled by controlling the pH thereof into a range of 5.0 to 5.8, and preferably into a range of 5.3 to 5.7. The pH thereof can be controlled by adding base and/or acid. The base may be aqueous ammonia, sodium hydroxide, potassium hydroxide, silicate of alkaline metal, or the like. The acid may be hydrochloric acid, citric acid, nitric acid, sulfuric acid, or the like. The pH-controlled gel is ripened in a stable state. The ripening process may be performed under a temperature in a range of 40 to 80° C. for a time period of 4 to 24 hour.

After the ripening process, preferably, the gel is pulverized. Desired aerogel particles can be easily obtained by the pulverization of the gel. The pulverizing process of the gel can be performed, for example, by: putting the gel in a Henshall type mixer or gelling the sol inside the mixer; and operating the mixer at a proper rotating speed for a proper period.

After the pulverizing process, preferably, the solvent substitution process is performed. In the solvent substitution process, the solvent (such as water) used for preparing the gel is substituted for another solvent having small surface tension in order to avoid the occurrence of drying shrinkage when the gel is dried. The solvent substitution process typically includes multiple steps, and preferably, two steps, because it is difficult to directly substitute water for the solvent having small surface tension. A criterion for selecting a solvent used for the first step may include: having good affinity with both water and a solvent used for the second step. The solvent used for the first step may be methanol, ethanol, isopropyl alcohol, acetone or the like, and ethanol is preferable. A criterion for selecting a solvent used for the second step may include: having less reactivity with a treatment agent used in a following hydrophobizing process; and having small surface tension so as to cause less drying shrinkage. The solvent used for the second step may be hexane, dichloromethane, methyl ethyl ketone or the like, and hexane is preferable. An additional solvent substitution step may be performed between the first solvent substitution step and the second solvent substitution step, as needed.

After the solvent substitution process, preferably, the hydrophobizing process is performed. Alkylalkoxysilane, halogenated alkylsilane, or the like can be used for a treatment agent in the hydrophobizing process. For example, dialkyldichlorosilane or monoalkyl trichlorosilane can be used preferably, and dimethildichlorosilane is used more preferably in view of the reactivity and the material cost. The hydrophobizing process may be performed before the solvent substitution process.

After the hydrophobizing process, the obtained gel is isolated from the solvent by filtering, and thereafter the gel is washed to remove the unreacted treatment agent. Thereafter, the gel is dried. The drying process may be performed under the ordinary pressure, and may be performed with heat and/or hot air. The drying process is preferably performed under an inert gas (e.g., nitrogen gas) atmosphere. According to this process, the solvent in the gel is removed from the gel, and thus the aerogel particles can be obtained.

The aerogel particles obtained by the supercritical drying method and the aerogel particles obtained based on the liquid glass have basically the same structure. That is, each of them has a particle structure in which silica microparticles are bound together so as to form a three dimensional mesh shape.

Shape of the aerogel particle is not particularly limited, and may be one of various shapes. Typically, the aerogel particles obtained by the above-mentioned method have indeterminate shapes because the aerogel particles are subject to the pulverizing process or the like. They may be, so to say, in a rock-shape having irregular surface. They also may be in a spherical-shape, a rugby-ball shape, a panel-shape, a flake-shape, a fiber-shape, or the like. The aerogel particles used for the molding may be a mixture of particles having different particle sizes. The sizes of the aerogel particles are not necessarily in uniform, because the particles are adhered to each other to be unified in the molded body. Regarding a size of the aerogel particles, a maximum length of the particles may fall within a range of 1 μm to 10 mm. In view of handleability and ease for molding, however, it is preferable that excessively large particles and excessively small particles be not mixed. To that end, it may be possible to set the size of the aerogel particles to a specific appropriate one. For example, the aerogel particles may be such micron-order particles that maximum lengths of the aerogel particles may fall within a range of equal to or more than 1 μm and less than 1 mm. Alternatively, the aerogel particles may have sizes of approximately 1 mm that maximum lengths of the aerogel particles fall within a range of equal to or more than 100 μm and less than 5 mm. Alternatively, the aerogel particles may be such mm-order particles that maximum lengths of the aerogel particles fall within a range of equal to or more than 1 mm and less than 10 mm. The preferable range of the average particle size of the aerogel particles is exemplified by a range of 500 μm to 1.5 mm.

According to the present invention, the aerogel particles as described above are used as material of the heat insulating layer constituting the heat insulating structure. Therefore, it is possible to obtain heat insulating structure which has low thermal conductivities and is excellent in thermal insulating properties.

Figure 1:
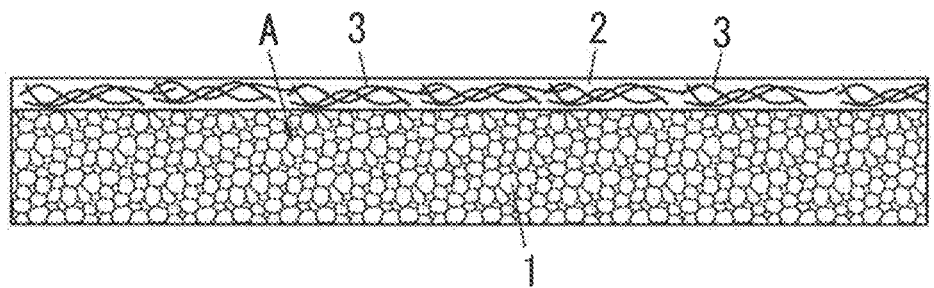
FIG. 1 is a schematic sectional view illustrating an example of an embodiment of heat insulating structure.

FIG. 1 illustrates an example of an embodiment of heat insulating structure using aerogel particles A.

The heat insulating structure of the present embodiment includes an aerogel layer 1 including the aerogel particles A and adhesive. The aerogel layer 1 forms a so-called heat insulating layer. The aerogel layer 1 is provided on one face of the aerogel layer 1 with a retainer 2. The retainer 2 includes fiber materials 3 and binder resin. The retainer 2 is placed on one face of the aerogel layer 1, and therefore it is possible to easily form the heat insulating structure in a structure by attaching the retainer 2 to the structure. Further, a surface of the aerogel layer 1 is reinforced and protected by the retainer 2. Therefore, it is possible to prevent the aerogel layer 1 from breaking. Particularly, the aerogel layer 1 constituted by the aerogel particles A bonded with adhesive is liable to break. However the retainer 2 attached to the aerogel layer 1 can increase strength of the aerogel layer 1 and protect the surface of the aerogel layer 1. Further, the retainer 2 is formed by bonding the fiber materials 3 with binder resin and has increased strength and therefore it is possible to prevent the aerogel layer 1 from being broken by external impact. Even when a force to bend the aerogel layer 1 is applied, the retainer 2 works to maintain its shape, and therefore it is possible to resist such a force and reduce occurrence of breakage such as a crack of the aerogel layer 1. Accordingly, it is possible to obtain the heat insulating structure which is higher in strength and is excellent in thermal insulating properties. Note that, in FIG. 1, a few of the fiber materials 3 are selected out and illustrated so as to make it clear that the fiber materials 3 are included in the retainer 2. In practice, the retainer 2 may include the fiber materials 3 such that the fiber materials 3 densely exist in the retainer 2. The densely existing fiber materials 3 increase the strength of the retainer 2.

The retainer 2 serves as a strength retention member for retaining strength of the heat insulating structure. In the aspect shown in FIG. 1, the retainer 2 is attached to one face of the aerogel layer 1. The retainer 2 may be attached to each of opposite faces of the retainer 2. By doing so, it is possible to increase the strength of the aerogel layer 1 and suppress breakage of the aerogel layer 1. Note that when the retainer 2 doubles as a member for reinforcing a structure, it is preferable that the retainer 2 be attached to one face of the aerogel layer 1. By doing so, it is possible to facilitate attachment to a structure.

It is preferable that the retainer 2 cover a whole surface of the aerogel layer 1. That is, the size of the retainer 2 is equal to or larger than the size of the aerogel layer 1 such that the retainer 2 covers from end to end of the aerogel layer 1. By doing so, the ends of the aerogel layer 1 are reinforced by the retainer 2 and accordingly breakage of an end of the aerogel layer 1 can be suppressed.

The aerogel layer 1 is composed of the multiple aerogel particles A bonded to each other with adhesive. Adhesive for bonding the aerogel particles A to form the aerogel layer 1 may be appropriate resin (resin composition) having adhesion properties. Examples of a main component of such resin include epoxy resin, phenolic resin, acrylic resin, melamine resin, vinyl acetate resin, silicone resin, urethane resin, polyethylene and polypropylene. Further, the resin composition may include components for promoting and/or supporting resin cure, for example, hardening agent, hardening accelerator, and polymeric initiator. The thickness of the aerogel layer 1 is not particularly limited, but may fall within a range of 1 to 100 mm so as to use the heat insulating structure as part of a structure.

The retainer 2 includes the fiber materials 3 and the binder resin. In the retainer 2, the multiple fiber materials 3 are bonded to each other with the binder resin. The retainer 2 is composed of the fiber materials 3 and the binder resin, thereby achieving weight saving and increase in strength. The fiber materials 3 may be composed of multiple fiber pieces.

The retainer 2 may be formed of a fabric composed of resin fibers packed and impregnated with a binder resin, or of cured composition in which the fiber materials 3 are dispersed in a binder resin. The fabric may be woven or unwoven thick fabric, or sheet of fibrous material. Preferably, the retainer 2 includes the fiber materials 3 in the form of fiber bundles composed of multiple monofilaments. Such fiber materials 3 are expected to improve entanglement thereof, and therefore give an increased mechanical strength to a thermal insulating structure. The fiber materials 3 may be in the form of a long filament. Further, it is also preferred that the fiber materials 3 are oriented within a plane of the retainer 2 to give an improved bend strength to the retainer 2.

The fiber length of each of the fiber materials 3 is not particularly limited. However, the fiber length is preferably within a length range of 5 mm to 5 m, especially of 5 cm to 20 cm. When the fiber length falls within the above length range, the strength of the heat insulating structure is further increased. The fiber diameter of each of the fiber materials 3 is not particularly limited. However, the fiber diameter is preferably within a diameter range of 3 to 20 $\mu$m. When the fiber diameter falls in the above diameter range, the strength of the heat insulating structure is further increased.

The fiber materials 3 may be appropriate fibers such as carbon fiber, glass fiber, organic fiber, synthetic fiber, and pulp. It is preferable that, among these fibers, carbon fiber be used as the fiber materials 3. When carbon fiber is used, the strength can be further increased. In addition, carbon fiber is lightweight and therefore can achieve weight saving of the heat insulating structure. Particularly, when the heat insulating structure is used as material of structures included in a vehicle body, it is advantageous to use carbon fiber.

The retainer 2 is composed of the multiple fiber materials 3 bonded to each other with the binder resin. The binder resin for bonding the fiber materials 3 to form the retainer 2 may be appropriate resin (resin composition) having adhesiveness. Examples of a main component of such resin include epoxy resin, phenolic resin, acrylic resin, melamine resin, vinyl acetate resin, silicone resin, urethane resin, polyethylene and polypropylene. Further, the resin composition may include components for promoting and/or supporting resin cure, for example, hardening agent, hardening accelerator, and polymeric initiator. The thickness of the retainer 2 is not particularly limited, but may fall within a range of 1 to 100 mm so as to use the heat insulating structure as part of a structure.

It is one preferred aspect that the binder resin used for the retainer 2 be the same as the adhesive for bonding the aerogel particles A. In the case, it is possible to enhance compatibility of the binder resin of the retainer 2 and the adhesive of the aerogel layer 1 and accordingly enhance an adhesion level at an interface between the retainer 2 and the aerogel layer 1. Moreover, it is possible to decrease the number of materials and accordingly improve productivity.

It is another preferred aspect that the binder resin used for the retainer 2 be different from the adhesive for bonding the aerogel particles A. In the case, it is possible to use, as the adhesive used in the aerogel layer 1, adhesive suitable to secure thermal insulating properties and increase the adhesion level between the aerogel particles A. Further, it is possible to use, as the binder resin used in the retainer 2, binder resin capable of holding the fiber materials 3 and increasing the strength. That is, when the binder resin and the adhesive are different from each other in a resin component, it is possible to adopt appropriate resin components from viewpoints of thermal insulating properties as for the aerogel layer 1 and strength as for the retainer 2, as well as adhesiveness. As a result, it is possible to obtain the heat insulating structure which is excellent in both of strength and thermal insulating properties. For example, the adhesive in the aerogel layer 1 may be phenolic resin and the binder resin in the retainer 2 may be epoxy resin.

It is more preferable that, in the heat insulating structure, the adhesive included in the aerogel layer 1 and the binder resin included in the retainer 2 be mixed with each other at an interface between the aerogel layer 1 and the retainer 2. Mixing of adhesive components at the interface can increase the adhesion level between the retainer 2 and the aerogel layer 1, and therefore it is possible to suppress peeling of the retainer 2 from the aerogel layer 1 and further increase the strength of the heat insulating structure. For example, it is possible to mix adhesive components by using, as material of the retainer 2, fiber-containing material in which the binder resin is uncured or partially-cured. When being impregnated with a liquid resin compositions as the binder resin, moist plate-shaped material is used. Note that cured plate material may be used as the retainer 2, and the retainer 2 and the aerogel layer 1 may be bonded to each other with the adhesive included in the aerogel layer 1. Mixing of the adhesive components can be confirmed by finding out formulation of a layer of region in which the adhesive component included in the aerogel layer 1 and the adhesive component included in the retainer 2 are mixed, by chemical analysis. Further, such confirmation can also be made by finding out that the adhesive in the aerogel layer 1 intrudes into the area of the retainer 2 or that the binder resin in the retainer 2 intrudes into the area of the aerogel layer 1.

The retainer 2 may be composite material formed of fibers bonded with plastic. In the case, it is possible to effectively increase the strength of the heat insulating structure. Particularly, when carbon fibers are used as material of the retainer 2, fibers included in the retainer 2 exert resistance against bending, thereby further increasing bend strength. In addition, when bonding of the aerogel particles A to each other and curing of the retainer 2 including the binder resin are performed in parallel, it is possible to strengthen bonding between the aerogel layer 1 and the retainer 2 so as to form heat insulating structure having high intensity.

The retainer 2 is adhered to the aerogel layer 1. In this regard, the retainer 2 may be adhered to the aerogel layer 1 with the adhesive used for bonding the aerogel particles A to be unified. Alternatively, the retainer 2 may be adhered to the aerogel layer 1 with the binder resin included in the retainer 2. Alternatively, the retainer 2 may be adhered to the aerogel layer 1 with adhesive applied between the aerogel layer 1 including the aerogel particles A and the retainer 2. In brief, it is sufficient that any adhesive agent is provided at an interface between the aerogel layer 1 and the retainer 2. When preparing adhesive agent derived from other than the retainer 2 and the aerogel layer 1 in order to bond the retainer 2 and the aerogel layer 1 to each other, organic or inorganic adhesive may be used. As this adhesive, the same kind of adhesive as the adhesive for bonding the aerogel particles A as described above may be used. It is also preferable that adhesive containing porous particles be used as the adhesive. By doing so, it is possible to improve thermal insulating properties of an adhesive layer. Examples of the porous particle include a mesoporous silica particle. The aerogel layer 1 of the heat insulating structure includes fibers. Therefore, it is possible to increase strength of the aerogel layer 1. For example, when bonding the aerogel particles A with the adhesive for shape-forming, fibers may be added to mixture (aerogel forming material) of the aerogel particles A and the adhesive such that the aerogel layer 1 includes the fibers. Glass fibers, carbon fibers or the like may be used as the fibers. The aerogel layer 1 including the fibers improves mechanical strength. It is preferable that the fibers included in the aerogel layer 1 be monofilaments. In the case of the aerogel layer 1 including monofilaments, it is possible to suppress thermal conduction in a thickness direction of the aerogel layer 1 and increase mechanical strength of the aerogel layer 1 while suppressing deterioration of the thermal insulating properties. Preferably, the fibers materials 3 included in the retainer 2 are in the form of fiber bundles so as to secure the strength of the retainer 2, and the fibers included in the aerogel compact are monofilaments so as not to deteriorate thermal insulating properties.

Each of the fibers included in the aerogel layer 1 is part of one of the fiber materials 3 included in the retainer 2.

Figure 2:
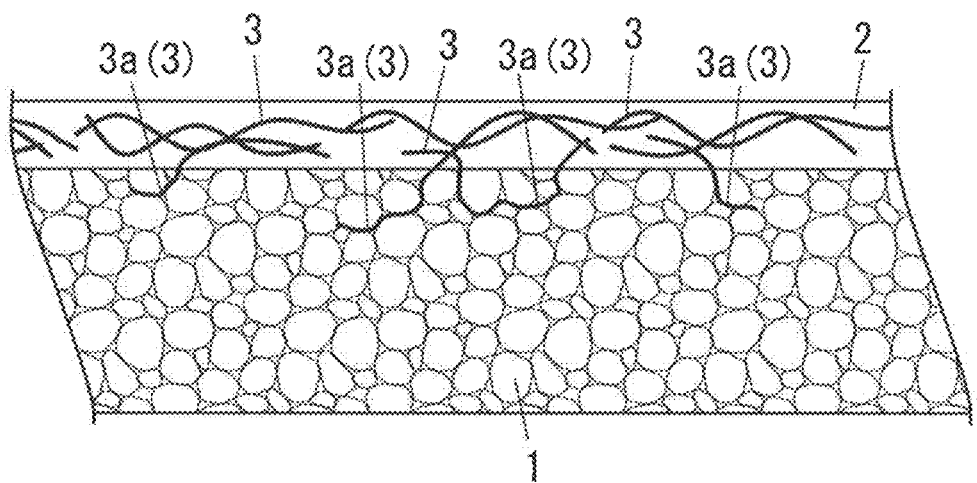
FIG. 2 is a schematic partial enlarged sectional view illustrating the example of the embodiment of the heat insulating structure.

FIG. 2 illustrates an example of the heat insulating structure in which each of the fibers included in the aerogel layer 1 is part of one of the fiber materials 3 in the retainer 2. The aerogel layer 1 may include additional fibers different from the fibers each of which is part of one of the fiber materials 3 in the retainer 2. In FIG. 2, parts of some fiber materials 3 project from the retainer 2 into the aerogel layer 1 so as to be included in the aerogel layer 1 as the fibers. In this manner, when parts of some fiber materials 3 are included in the aerogel layer 1, it is possible to strengthen bonding between the aerogel layer 1 and the retainer 2 and further increase the strength of the heat insulating structure. The bonding strength at an interface between the aerogel layer 1 and the retainer 2 is increased. FIG. 2 is an enlarged view illustrating the interface between the aerogel layer 1 and the retainer 2 of the heat insulating structure shown in FIG. 1.

In the aspect shown in FIG. 2, parts of some fiber material 3 extend into spaces between the aerogel particles A in the aerogel layer 1. Part of one of the fiber materials 3 which is included in the aerogel layer 1 is defined as an insertion part 3a. In this manner, when parts of the fiber materials 3 are inserted into the aerogel layer 1, the retainer 2 and the aerogel layer 1 are bonded to each other to be unified. Accordingly, the bonding between the retainer 2 and the aerogel layer 1 can be effectively strengthened.

Projection of the fiber materials 3 may be caused, for example, by roughening the surface of the retainer 2. When the retainer 2 is made of the fabric (fibrous form), the roughening is made, for example, by fuzzing one surface, opposed to the aerogel layer 1, of the fabric to raise the fiber materials 3. The fuzzing is made only to the one surface (interior surface) of the retainer 2 opposed to the aerogel layer 1. Fuzzing the exterior surface of the retainer 2 might reduce the strength or mar the appearance of the retainer 2. Brushing may be made to fuzz the fiber materials 3. Scrubbing instruments in the form of a brush, for example, may be used in a fabrication line. With this arrangement, the retainer 2 is finished to have the fiber materials 3 projecting from its surface opposed to the aerogel layer 1. The retainer 2 is held with its surface fuzzed with the fiber materials 3 against the aerogel layer 1, and is pressed to extend the fiber materials 3 projecting from the fuzzed surface into between the particles of the aerogel layer 1, and thereby the retainer 2 is bonded to the aerogel layer 1. In this manner, there is obtained the heat insulating structure in which the projecting fiber materials 3 are entangled into the aerogel layer 1, as shown in FIG. 2. When the retainer 2 is made of the resin impregnated fabric in which the fiber materials 3 are impregnated with the resin, the fiber materials 3 are fuzzed or raised prior to the curing of the resin, and thereby formation of the projecting fiber materials 3 is facilitated.

Part of a fiber material 3 may project. That is, part of a fiber material 3 may project and the remaining part of the fiber material 3 may be fixed with the binder resin in the retainer 2. In this regard, the projecting fiber materials 3 may include a fiber material 3 projecting out in such a mustache-like manner that at least one end of the fiber material 3 projects out, may include a fiber material 3 projecting out in such a loop-like manner that at least one curved middle portion of a fiber material 3 projects out, or may include both of fiber materials 3 projecting out in the mustache-like manner and the loop-like manner. In a case where the fiber materials 3 include those having projecting ends, the projecting ends can easily extend into spaces between the particles. In a case where the projecting fiber materials 3 include those having projecting curved middle portion, the retainer 2 can be attached to the aerogel layer 1 in such a manner that the projecting curved middle portions of the fiber materials 3 are caught by the particles and entangled with the particles. FIG. 2 illustrates an aspect where both the loop-like projecting fiber materials 3 and the mustache-like projecting fiber materials 3 exist.

Projection length (length of projecting part of the fiber materials 3 in a direction perpendicular to a surface of the retainer 2) of the fiber materials 3 may fall within a range of 500 to 3000 μm. When the projection length of the fiber materials 3 falls within this range, it is possible to effectively improve adhesion properties and increase strength. The projection length of the fiber material 3 is equal to a depth of part of the aerogel layer 1 in which the fiber materials 3 intrude. The depth of part, where the fiber materials 3 exist, of the aerogel layer 1 is not limited particularly, but may fall within a range of 1 to 50% or 5 to 30% of the thickness of the aerogel layer 1. By doing so, adhesion properties are more improved.

The fiber materials 3 may be partially dug into the aerogel layer 1. In a case where the fiber materials 3 of the retainer 2 are partially dug into the aerogel layer 1, the fiber materials 3 can firmly support the aerogel layer 1.

In the heat insulating structure shown in FIG. 1, a frame may be placed at an outer periphery of the aerogel layer 1, thereby increasing the strength of the heat insulating structure and suppressing breakage such as a crack of an end of the aerogel layer 1. It is preferable that the frame have thermal insulating properties. For example, when the frame is made of resin foam, it is possible to easily increase the strength while keeping thermal insulating properties.

The heat insulating structure of the aspect shown in FIG. 1 may be formed into a plate shape (board shape). The heat insulating structure may be formed into a quadrangular shape in a plan view. The heat insulating structure may be formed into a three-dimensional shape having a bulgy surface, for example. When the heat insulating structure has a plate shape, it is possible to facilitate use of the heat insulating structure as a thermal insulator for a structure, for example, a panel attached to a structure. The size of the heat insulating structure is not particularly limited, but the heat insulating structure in the form of a board may be formed to have four sides falling within a range equal to or more than 0.1 m and equal to or less than 10 m. Note that the thickness of the heat insulating structure may be equal to the sum of the thickness of the aerogel layer 1 and the thickness of the retainer 2.

Figure 3:
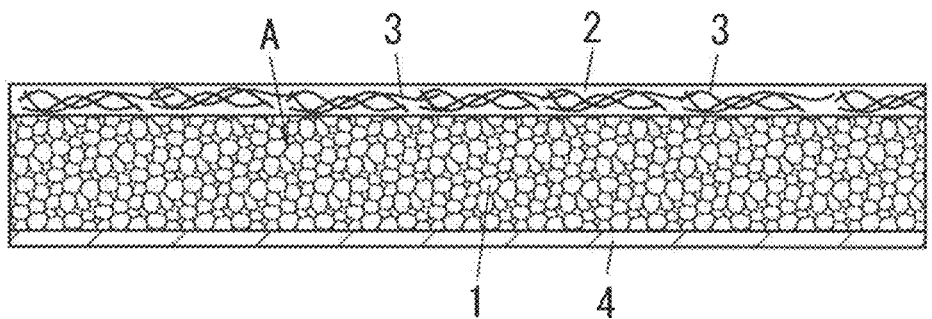
FIG. 3 is a schematic sectional view illustrating an example of another embodiment of the heat insulating structure.

FIG. 3 illustrates another example of the embodiment of the heat insulating structure using the aerogel particles A. In the heat insulating structure, the aerogel layer 1 is provided at one face of the aerogel layer 1 with the retainer 2 and at the other face of the aerogel layer 1 with a fiber sheet 4. The aerogel layer 1 and the retainer 2 are same as the aerogel layer 1 and the retainer 2 described in the above aspect, respectively.

In the present aspect, the fiber sheet 4 is placed on an opposite face of the aerogel layer 1 from the retainer 2. Therefore, it is possible to cover and protect the surface of the aerogel layer 1, and suppress occurrence of a crack and a chip so as to reduce occurrence of breakage of the aerogel layer 1. Further, it is possible to reinforce the opposite face of the aerogel layer 1 from the retainer 2 and therefore increase the strength of the heat insulating structure. Accordingly, it is possible to obtain the heat insulating structure with increased strength and excellent thermal insulating properties.

The fiber sheet 4 may be appropriate sheet material including fibers, for example, woven or unwoven fabric. Examples of the fiber include glass fiber, organic fiber, and pulp. Particularly, it is preferable to use glass fiber cloth. When glass fiber cloth is used, it is possible to further increase the strength while achieving weight saving and thickness reduction. Fibers impregnated with resin may be used for the fiber sheet 4. The fibers impregnated with resin are exemplified by resin-impregnated glass fiber cloth. When the fibers impregnated with resin and the aerogel layer 1 are adhered to each other to be unified, an adhesion level between the fiber sheet 4 and the aerogel layer 1 is increased, thereby further increasing the strength of the heat insulating structure. This resin may be the above-described adhesive used for bonding the aerogel particles A to each other.

The fiber sheet 4 is adhered to the aerogel layer 1 with adhesive agent. In this regard, the fiber sheet 4 may be adhered with adhesive applied between the aerogel layer 1 composed of the aerogel particles A and the fiber sheet 4. Alternatively, the fiber sheet 4 may be adhered with adhesive used for bonding the aerogel particles A to each other to be unified. Alternatively, in a case where the fiber sheet 4 is impregnated with resin, the fiber sheet 4 may be adhered to the aerogel layer 1 with the resin. That is, it is sufficient that any adhesive agent is provided at an interface between the aerogel layer 1 and the fiber sheet 4. When preparing adhesive agent derived from other than the fiber sheet 4 and the aerogel layer 1 to bond the fiber sheet 4 and the aerogel layer 1 to each other, the above-described adhesive used for bonding the aerogel particles A to each other may be used.

In the aspect shown in FIG. 3, as with the aspect shown in FIG. 2, parts of the fiber materials 3 in the retainer 2 extend into the aerogel layer 1. Therefore, as explained in FIG. 2, it is possible to increase an adhesion level between the aerogel layer 1 and the retainer 2 and accordingly increase the strength of the heat insulating structure.

Figure 4A:
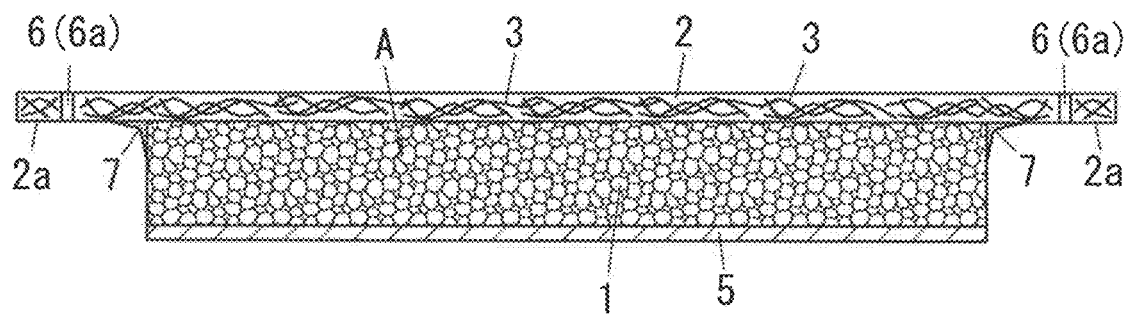
FIG. 4A is a schematic sectional view illustrating an example of another embodiment of the heat insulating structure and illustrates the whole of the embodiment.
Figure 4B:
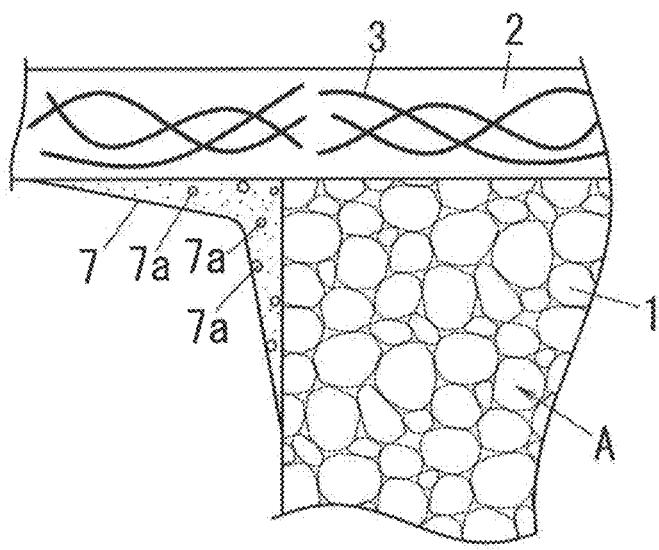
FIG. 4B is a schematic sectional view illustrating the example of the above embodiment of the heat insulating structure and illustrates enlarged part of the structure of the embodiment.

FIGS. 4A and 4B illustrate another example of the embodiment of the heat insulating structure using the aerogel particles A. In this heat insulating structure, the retainer 2 is placed on one face of the aerogel layer 1, and a heat barrier layer 5 is placed on the other face of the aerogel layer 1. It is a preferred aspect that the heat barrier layer 5 extends along the aerogel layer 1. FIG. 4A is a schematic sectional view illustrating the whole of the heat insulating structure, and FIG. 4B is a schematic enlarged sectional view illustrating part of the heat insulating structure.

In the present aspect, the retainer 2 is somewhat larger than the aerogel layer 1 in a plan view (when viewed in a direction perpendicular to the surface of the aerogel layer 1) such that the periphery of the retainer 2 extends horizontally beyond the periphery of the aerogel layer 1. The periphery of the retainer 2 extending beyond the periphery of the aerogel layer 1 is defined as an extension part 2a. The extension part 2a has a through hole 6a for attaching the heat insulating structure to a structure with a fixing piece such as a screw and a nail. The through hole 6a is an example of attachment structure 6 for attaching the heating insulating structure to a structure. It is preferable that the retainer 2 have the attachment structure 6 for attachment to a structure. The attachment structure 6 is provided to each end part of the retainer 2 and therefore it is possible to easily attach the heat insulating structure to a structure. Note that the attachment structure 6 is not limited to the through hole 6a. For example, the attachment structure 6 may have fitting structure to be coupled with an attachment part of the structure.

It is preferable that a fillet part 7 be placed at a boundary between the aerogel layer 1 and the retainer 2. The fillet part 7 is formed so as to cover the boundary between the aerogel layer 1 and the retainer 2. The fillet part 7 may be made of resin material. The fillet part 7 can reduce stress concentration at an adhesive interface and strongly bond the aerogel layer 1 and the retainer 2. The fillet part 7 may be formed so as to cover a periphery of the interface between the aerogel layer 1 and the retainer 2. The fillet part 7 may be formed by applying resin material after the aerogel layer 1 and the retainer 2 are bonded to each other, or be formed of excess adhesive in the process of bonding the aerogel layer 1 and the retainer 2 to each other. The resin material is exemplified by component of the adhesive used for bonding the aerogel particles A to each other, such as epoxy resin and acrylic resin. Further, it is also preferable that the fillet part 7 have porous structure inside so as to suppress thermal conduction inside the fillet part 7. Such porous structure may be formed by adding porous material particles 7a, foamed resin material or a mixture of porous material particles 7a and foamed resin material. FIG. 4B illustrates an aspect where the porous material particles 7a are dispersed in the fillet part 7. Material of the porous material particles 7a is not limited particularly, but may be inorganic material such as void glass beads, Shirasu balloon, fumed silica, and aerogel, or resin porous particles such as polystyrene and polyimide. The foamed resin material is not limited particularly, but it is preferable that foamed resin material such as urethane foam be used. It is not necessarily required that the fillet part 7 has porous structure.

Figure 5A:
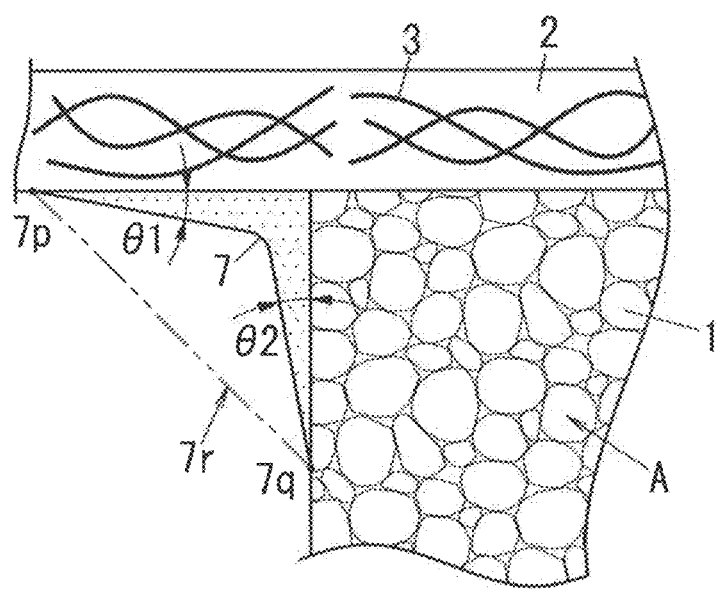
FIG. 5A is a sectional view for explanation of the heat insulating structure.
Figure 5B:
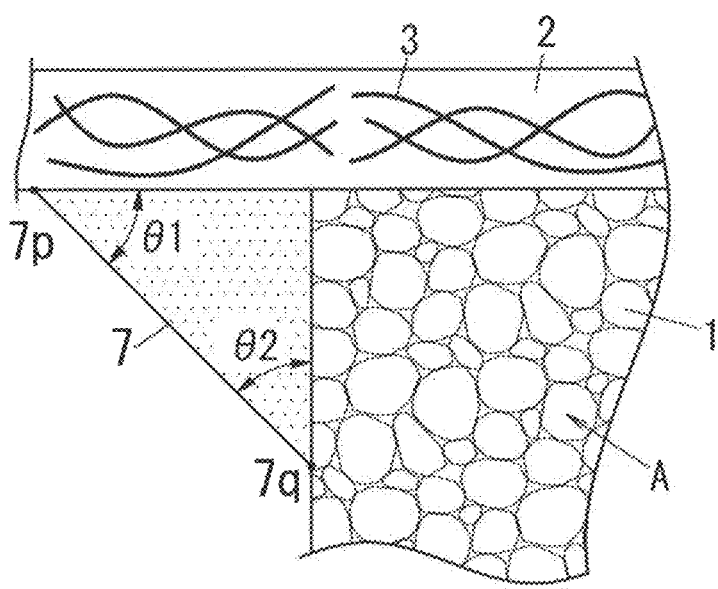
FIG. 5B is a sectional view for explanation of the heat insulating structure.
Figure 5C:
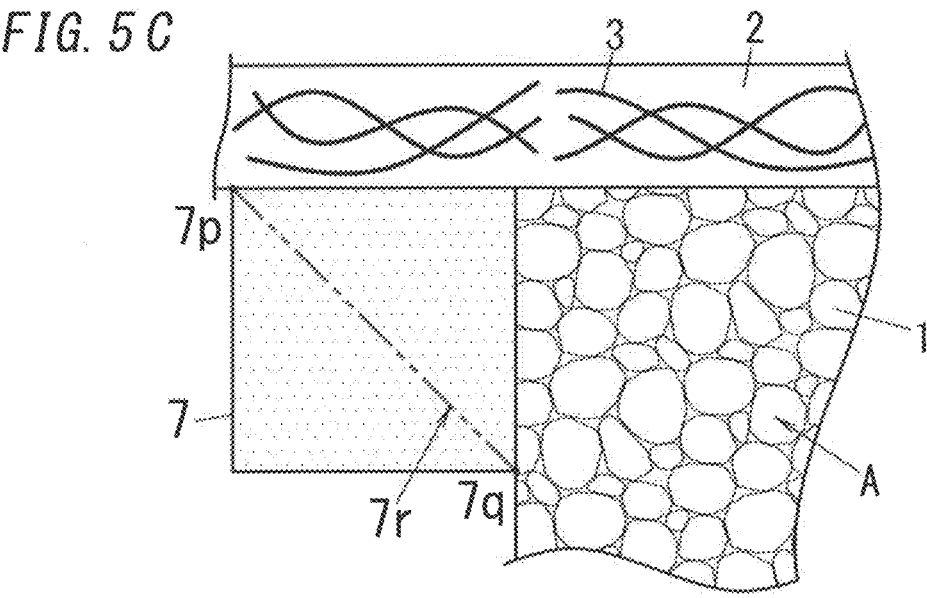
FIG. 5C is a sectional view for explanation of the heat insulating structure.

FIGS. 5A to 5C are explanation views for explanation of the shape of the fillet part 7 in the heat insulating structure. As shown in FIGS. 5A and 5B, the fillet part 7 is provided in order to reduce stress concentration at an adhesion interface, and preferably is formed at the interface between the retainer 2 and the aerogel layer 1 so as not to protrude.

Therefore, it is preferable that the fillet part 7 is formed so as not to reach a straight line 7r connecting a boundary point 7p between the fillet part 7 and the retainer 2 and a boundary point 7q between the fillet part 7 and the aerogel layer 1. The fillet part 7 shown in FIG. 5C extends beyond the straight line 7r connecting the boundary point 7p between the fillet part 7 and the retainer 2 and the boundary point 7q between the fillet part 7 and the aerogel layer 1. In such a case, stress concentration may not be reduced. The distance between the retainer 2 and the boundary point 7q is preferably equal to or less than a half of the thickness of the aerogel layer 1, and is more preferably equal to or less than one third of the thickness of the aerogel layer 1. Preferably, a corner of the interface between the retainer 2 and the aerogel layer 1 be fully covered with the fillet part 7, but in a precise sense need not be fully covered with the fillet part 7. Even when there is somewhat a void at the corner, it is possible to keep the strength.

As shown in FIG. 5A, a tilt angle of the fillet part 7 measured from the surface of the retainer 2 is defined as a rising angle $\theta1$. The rising angle $\theta1$ is preferably equal to or less than 90 degree. A tilt angle of the fillet part 7 measured from the surface of the aerogel layer 1 is defined as a rising angle $\theta2$. The rising angle $\theta2$ is preferably equal to or less than 90 degree. Therefore, it is preferable that both of the rising angle $\theta1$ and the rising angle $\theta2$ are equal to or less than 90 degree. It is more preferable that both of the rising angle $\theta1$ and the rising angle $\theta2$ are equal to or less than 45 degree, and it is much more preferable that both of the rising angle $\theta1$ and the rising angle $\theta2$ are equal to or less than 30 degree. When the surface of the fillet part 7 smoothly extends from the surface of the retainer 2 and the side surface of the aerogel layer 1, it is possible to increase stress reduction effect. FIG. 5B illustrates an example where the rising angle $\theta1$ and the rising angle $\theta2$ are 45 degree and the surface of the fillet part 7 is flat. FIG. 5A illustrates an example where the rising angle $\theta1$ and the rising angle $\theta2$ are less than 45 degree and the surface of the fillet part 7 is curved. It is preferable that, as shown in FIG. 5A, the fillet part 7 is formed to be curved along the surface of the retainer 2 and the side surface of the aerogel layer 1. When both the rising angle $\theta1$ and the rising angle $\theta2$ are less than 45 degree, the surface of the fillet part 7 is not flat, but concave. The surface of the fillet part 7 may be composed of multiple flat surfaces. The surface of the fillet part 7 may be formed into a so-called cut-glass shape. Alternatively, the surface of the fillet part 7 may be facetted. Note that, in view of stress reduction, it is more preferable that the surface of the fillet part 7 is curved so as to smoothly rise from the respective surfaces.

The heat barrier layer 5 is provided to restrict or inhibit the heat transfer, and is preferably made to include a metal repelling heat radiation. It is more preferable that the heat barrier layer 5 contain aluminum. When the heat barrier layer 5 contains aluminum, it is possible to suppress thermal transfer caused by radiation, and accordingly heat barrier effect and thermal insulating properties can be improved. Aluminum reflects infrared light and therefore improves thermal insulating properties more. It is a preferred aspect that the heat barrier layer 5 is composed of an aluminum sheet. For example, the heat barrier layer 5 composed of an aluminum evaporated sheet is excellent in handleability and heat barrier properties, and thus favorable. Alternatively, the heat barrier layer 5 may be composed of a composite sheet such as a laminated body including aluminum foil and resin sheet. The thickness of the heat barrier layer 5 is not limited particularly, but may be within a range of 0.001 to 10 mm.

In the aspect shown in FIGS. 4A and 4B, an opposite surface of the aerogel layer 1 from the retainer 2 is covered with the heat barrier layer 5. The heat barrier layer 5 is adhered to the aerogel layer 1 with adhesive. To that end, a separate adhesive rather than the adhesive used for bonding the aerogel particles A may be applied, or the adhesive for bonding the aerogel particles A may be used. The heat barrier layer 5 preferably serves as a protection member to protect the surface of the aerogel layer 1 as well.

FIGS. 4A and 4B illustrate an example where the retainer 2 is provided to one face of the aerogel layer 1 and the heat barrier layer 5 is provided to the other face of the aerogel layer 1, but structure provided with the heat barrier layer 5 is not limited to the structure as shown in the example. For example, the heat barrier layer 5 may be placed between the retainer 2 and the aerogel layer 1. Also, the heat barrier layer 5 may be placed on an opposite surface of the aerogel layer 1 from the retainer 2, and the fiber sheet 4 shown in FIG. 3 may be placed on the heat barrier layer 5. Also, the aerogel layer 1 may be composed of multiple layers and the heat barrier layer 5 may be inserted between the multiple layers. In those cases, the heat barrier layer 5 is provided in the form of a layer and therefore it is possible to suppress thermal conduction and increase thermal insulating properties. However, in view of attachment of the heat insulating structure to a structure, it is preferable that the heat barrier layer 5 be placed on the surface of the aerogel layer 1 as shown in FIGS. 4A and 4B.

In the aspect illustrated in FIGS. 4A and 4B, as with the aspect illustrated in FIG. 2, it is more preferable that parts of some fiber materials 3 of the retainer 2 extends into the aerogel layer 1, thereby strengthening bonding between the aerogel layer 1 and the retainer 2 and increasing the strength of the heat insulating structure, as explained in FIG. 2.

The heat insulating structure as explained in FIGS. 1 to 3, 4A and 4B can be attached to a structure such as a vehicle body and can be used as structure material or interior material of a vehicle body. This vehicle body is an aircraft, a ship, a spacecraft, a rocket or the like, or a wheeled vehicle such as an automobile and a rail car. The vehicle body may be movable. For a movable body, durability under harsh conditions is required. When the heat insulating structure as described above is used for such a movable body, the retainer 2 can increase strength of the heat insulating structure and therefore suppress breakage of the heat insulating structure. As the vehicle body, a vehicle body for people boarding is feasible. The heat insulating structure is excellent in thermal insulating properties, and therefore it is possible to keep appropriate temperature inside the vehicle body. Note that the vehicle body may be not for people boarding. In the case, it is possible to improve temperature environment inside the vehicle body and reduce loads on machines and devices. Further, the heat insulating structure has increased strength, and therefore it is possible to increase strength of a structure. Additionally, the heat insulating structure is lightweight, and therefore it is possible to reduce vehicle body weight and improve fuel efficiency (fuel economy). As a matter of course, it is possible to attach the heat insulating structure to structures other than the vehicle body, for example, architectural structures.

In order to attach the heat insulating structure to a structure, the retainer 2 may be attached to a wall, a ceiling, a floor or the like of the structure, for example. It is preferable that the retainer 2 is placed so as to face outward and the aerogel layer 1 is placed so as to face inward, thereby giving increased strength and improved thermal insulating properties to the structure.

Next, the following explanations are made to manufacture of the heat insulating structure.

In the process of manufacturing the heat insulating structure of the aspect shown in FIG. 1, it is preferable that the aerogel particles A be bonded with adhesive to be unified and form the aerogel layer 1, along with adhesion of the retainer 2 to the surface of the aerogel layer 1. In this regard, for example, mixture of the aerogel particles A and the adhesive may be prepared preliminarily and the mixture and the retainer 2 may be arranged in layers and be pressed with a forming die such that resin including the adhesive is cured.

Material of the retainer 2 may be already-cured one, but it is also preferable to use not fully cured one. When using fiber-containing material uncured or partially cured, it is possible to cure the retainer 2 while bonding the retainer 2 to the aerogel layer 1, and achieve efficient forming and strong adhesive bonding. It is preferable to perform bonding the aerogel particles A to each other and bonding between the aerogel layer 1 and the retainer 2 by pressing. It is possible to easily perform strong adhesive bonding by pressing. Further, by performing pressing with heat and pressure, it is possible to increase the adhesion level. Particularly, when fiber-containing resin composition is used as the retainer 2, bonding of the aerogel particles A to each other, forming of the retainer 2 and bonding between the retainer 2 and the aerogel layer 1 can be performed in parallel, and accordingly efficiency of bonding and forming can be further improved. Additionally, pressing facilitates mixing of adhesive agents.

In order to obtain a structure where parts of the fiber materials 3 of the retainer 2 are included in the aerogel layer 1, material of the retainer 2 may be partially cured, the surface of the retainer 2 may be fuzzed and roughened such that parts of some of the fiber materials 3 project out. Alternatively, a fabric in the form of a plate which is made of the fiber materials 3 packed may be used as material of the retainer 2, the surface of the retainer 2 may be fuzzed such that parts of some of the fiber materials 3 project out and thereafter the fabric may be impregnated with the binder resin.

Pressing may be performed by appropriately using material to assist release from a press die, such as release agent and release sheet.

As described above, the heat insulating structure as shown in FIG. 1 may be formed by performing bonding and forming of the aerogel particles A and the retainer 2 by pressing.

In a case where a frame made of resin foam or the like is provided to a periphery of the heat insulating structure, the frame may be adhered to the aerogel layer 1 by, after pressing, putting the adhesive-applied frame around the periphery.

The heat insulating structure of each aspect shown in FIGS. 3, 4A and 4B may be manufactured according to and in a similar manner to the above mentioned manner.

When manufacturing the heat insulating structure of the aspect shown in FIG. 3, the fiber sheet 4 may, after pressing, be bonded to an opposite surface of the aerogel layer 1 from the retainer 2 with adhesive. Alternatively, the heat insulating structure shown in FIG. 3 may be formed by stacking the fiber sheet 4, material of the aerogel layer 1 and material of the retainer 2 before pressing, and pressing the stack of layers. In this case, it is possible to perform integral molding, thereby facilitating manufacture, and enhancing an adhesion level between the fiber sheet 4 and the aerogel layer 1 to increase the strength of the heat insulating structure more.

When manufacturing the heat insulating structure of the aspect shown in FIGS. 4A and 4B, material of the heat barrier layer 5 may, after pressing, be bonded to an opposite surface of the aerogel layer 1 from the retainer 2 with adhesive. Alternatively, the heat insulating structure shown in FIGS. 4A and 4B may be formed by stacking the heat barrier layer 5, material of the aerogel layer 1 and material of the retainer 2 before pressing, and pressing the stack of layers. In this case, it is possible to perform integral molding, thereby facilitating manufacture, and enhancing an adhesion level between the heat barrier layer 5 and the aerogel layer 1 to increase the strength of the heat insulating structure.

In a case where the extension part 2a of the retainer 2 is provided, the extension part 2a is formed by forming the retainer 2 so as to be larger than the aerogel layer 1. After the forming, an through hole is formed with an appropriate hole punch such as a drill so as to form the through hole 6a as the attachment structure 6 in the extension part 2a.

In the above respective aspects, the heat insulating structure may be formed to be a plate-shaped heat insulating structure (heat insulating panel). In a case where the heat insulating structure is formed into a plate shape, it is possible to easily replace the heat insulating structure when part of the heat insulating structure used in a structure is broken or deteriorated. Note that it is possible to form the heat insulating structure into a shape other than a board by performing pressing with an appropriate forming die. The heat insulating structure formed in this manner is excellent in thermal insulating properties and higher in strength, and therefore is valuable as material of a structure. Particularly, the heat insulating structure can be used for movable vehicle bodies, especially, walls of an aircraft, a spacecraft, a rail car, an automobile, a ship or the like.

REFERENCE SIGNS LIST

A: aerogel particle
1: aerogel layer
2: retainer
2a: extension part
3: fiber material
3a: insertion part
4: fiber sheet
5: heat barrier layer
6: attachment structure
6a: through hole
7: fillet part
7a: porous material particle

The invention claimed is:
1. Heat insulating structure comprising:
an aerogel layer including aerogel particles, adhesive, and fibers;
a retainer which is provided to at least one face of the aerogel layer and includes fiber materials and binder resin, and
a fillet part situated at a boundary between the aerogel layer and the retainer, wherein:
parts of some of the fiber materials project from the retainer into the aerogel layer, and wherein each of the fibers of the aerogel layer is part of one of the fiber materials included in the retainer,
the parts of the fiber materials projecting from the retainer into the aerogel layer include
a fiber material including a looped middle portion which is in the aerogel layer and a fiber material including an unlooped end which is in the aerogel layer, a projection length that the looped middle portion projects into the aerogel layer is from 5 to 50% of the thickness of the aerogel layer, the retainer is larger than the aerogel layer in a plan view, a periphery of the retainer extends horizontally beyond a periphery of the aerogel layer, the fillet part covers a periphery of the boundary between the aerogel layer and the retainer, a rising angle that is defined as a tilt angle of the fillet part measured from a surface of the retainer is equal to or less than 90 degrees, and a rising angle that is defined as a tilt angle of the fillet part measured from a surface of the aerogel layer is equal to or less than 90 degrees.

2. The heat insulating structure according to claim 1, wherein the adhesive included in the aerogel layer and the binder resin included in the retainer are mixed with each other at an interface between the aerogel layer and the retainer.

3. The heat insulating structure according to claim 1, wherein the fiber material is a carbon fiber.

4. The heat insulating structure according to claim 1, wherein the retainer is provided on one face of the aerogel layer, and a fiber sheet is provided on the other face of the aerogel layer.

5. The heat insulating structure according to claim 1, further comprising a heat barrier layer extending along the aerogel layer.

6. The heat insulating structure according to claim 1, wherein the retainer is provided with an attachment structure, and the attachment structure is a through hole or a fitting structure.

7. The heat insulating structure according to claim 1, wherein the fillet part has a porous structure.

* * * * *